US009891845B2

(12) United States Patent
Gentile et al.

(10) Patent No.: US 9,891,845 B2
(45) Date of Patent: Feb. 13, 2018

(54) REUSING A DUPLEXED STORAGE RESOURCE

(71) Applicant: International Business Machines Corporation, Armonk, NY (US)

(72) Inventors: Joseph W. Gentile, New Paltz, NY (US); Jie Hou, Ossining, NY (US); Andrew M. Sica, Oxford, CT (US); Douglas M. Zobre, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 14/748,673

(22) Filed: Jun. 24, 2015

(65) Prior Publication Data

US 2016/0378362 A1    Dec. 29, 2016

(51) Int. Cl.
*G06F 12/00*  (2006.01)
*G06F 3/06*   (2006.01)

(52) U.S. Cl.
CPC .......... *G06F 3/0617* (2013.01); *G06F 3/0607* (2013.01); *G06F 3/0647* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,504,861 A | 4/1996 | Crockett et al. | |
| 6,088,815 A | 7/2000 | West et al. | |
| 7,409,586 B1 | 8/2008 | Bezbaruah et al. | |
| 7,793,061 B1 | 9/2010 | Gupta et al. | |
| 7,913,109 B2 | 3/2011 | Ogihara et al. | |
| 8,935,498 B1 | 1/2015 | Natanzon | |
| 9,036,283 B1 | 5/2015 | Tsai et al. | |
| 9,128,636 B2 | 9/2015 | Arakawa | |
| 2002/0016827 A1 | 2/2002 | McCabe et al. | |
| 2003/0229689 A1 | 12/2003 | Raghavan et al. | |

(Continued)

OTHER PUBLICATIONS

IBM et al., "Online Recovery of Duplexed Logical Volumes", An IP.com Prior Art Database Technical Disclosure, Original Publication Date: Oct. 1, 1984, Original Disclosure Information: TDB 10-84 p. 3112-3120, IP.com No. 000044039, IP.com Electronic Publication: Feb. 5, 2005, pp. 1-5.

(Continued)

*Primary Examiner* — Prasith Thammavong
*Assistant Examiner* — Jason Blust
(74) *Attorney, Agent, or Firm* — Brian M. Restauro (57) ABSTRACT

Embodiments of the present invention provide methods, program products, and systems for reusing a duplex storage medium resource. Embodiments of the present invention can be used to transition between duplex media by determining that a prior transition from a first duplex storage media to a second duplex storage media is being performed and reinitializing the second duplex storage media to receive, for storage, duplex data transferred from the first duplex storage media. Embodiments of the present invention can be used to reduce potential collisions with naming conventions and reduce unwanted delay that results in forcing an offload by managing the recovery medium and keeping it available through policy based medium changes.

20 Claims, 4 Drawing Sheets

(56) References Cited

U.S. PATENT DOCUMENTS

| | | | |
|---|---|---|---|
| 2005/0210315 A1* | 9/2005 | Oda | G06F 21/552 |
| | | | 714/6.1 |
| 2007/0011423 A1 | 1/2007 | Kaneda et al. | |
| 2007/0233950 A1* | 10/2007 | Innan | G06F 1/3221 |
| | | | 711/114 |
| 2008/0104345 A1 | 5/2008 | Maruyama et al. | |
| 2008/0215808 A1* | 9/2008 | Ashmore | G06F 1/3203 |
| | | | 711/113 |
| 2009/0037655 A1 | 2/2009 | Cherian et al. | |
| 2013/0232377 A1 | 9/2013 | Kakihara et al. | |
| 2014/0115579 A1 | 4/2014 | Kong | |

OTHER PUBLICATIONS

IBM®, "OA45747: IXG217E and IXG113E When a Log Stream Structure in Duplex Mode Transitions to Simplex Mode", R780 PSY UA75765, UP14/12/17 P F412, R790 PSY UA75766, UP14/12/17 P F412, Dec. 17, 2014, pp. 1-3, Grace Period Disclosure.

Software Patent Institute et al., "Dynamic Reconfiguration in a Modular Computer System", An IP.com Prior Art Database Technical Disclosure, MIT Project MAC, Original Publication Date: Jun. 30, 1971, IP.com No.000149030, IP.com Electronic Publication: Mar. 30, 2007, Database entry Copyright (c) Software Patent Institute, pp. 1-385.

U.S. Appl. No. 14/976,444, Entitled "Reusing a Duplexed Storage Resource", filed Dec. 21, 2015.

Appendix P.: List of IBM Patents or Patent Application's Treated as Related, Dated Jan. 28, 2016, 2 pages.

* cited by examiner

REUSING A DUPLEXED STORAGE RESOURCE

STATEMENT REGARDING PRIOR DISCLOSURES BY THE INVENTOR OR A JOINT INVENTOR

The following disclosure(s) are submitted under 35 U.S.C. § 102(b)(1)(A):
Disclosure(s)
(1) Andrew M. Sica, Douglas M. Zobre, Joseph W. Gentile, and Jie Hou, Patch UA75765 for z/OS Version 1.13, Dec. 17, 2014.
(2) Andrew M. Sica, Douglas M. Zobre, Joseph W. Gentile, and Jie Hou, Patch UA75766 for z/OS Version 2.1, Dec. 17, 2014.

BACKGROUND OF THE INVENTION

The present invention relates generally to storage resources, and more particularly to reusing a duplexed storage resource.

System loggers typically comprise a set of services that allows an application to write, browse, and delete log data. Typically, system logger services can be used to merge data from multiple instances of an application. A common log of all updates across systems connected to a database is generally maintained so that in the event the database is damaged, it can be restored from a backup copy. Typically, log data from applications are merged across the systems into a log stream (i.e., a collection of data in log blocks residing in a coupling facility and on a direct access storage device).

SUMMARY

Embodiments of the present invention provide methods, program products, and systems for reusing a duplex storage medium resource. In one embodiment of the present invention, a method is provided comprising: receiving application data; storing the application data on a primary storage media; storing duplex data of the application data on a first duplex storage media; responsive to receiving a signal to transition from the first duplex storage media to a second duplex storage media, determining whether a prior transition from a storage media to the second duplex storage media is being performed; and responsive to determining that a prior transition from a storage media to the second duplex storage media is being performed, reinitializing the second duplex storage media to receive for storage duplex data transferred from the first duplex storage media.

DETAILED DESCRIPTION

Embodiments of the present invention recognize that transitioning between different duplex media types can affect performance of a computing environment. In some instances, transitioning occurs from a primary storage resource back to a duplex storage medium which can create problems for the computing environment. For example, a third duplex copy might need to be created and managed which can take up resources. Further, potential collisions with naming conventions for existing old media types could produce errors. In other instances, an offload (i.e., migration of log data from a primary storage media to free resources of the primary storage media) of the old media type has yet to be performed. Forcing an offload of an old media residing on the duplex storage media could result in unwanted delay. Embodiments of the present invention provide solutions for problems that result from transitioning between different duplex media types by reinitializing the old duplex media. In this manner, as discussed in greater detail in the specification, embodiments of the present invention can reduce potential collisions with naming conventions and reduce unwanted delay that results in forcing an offload by managing the recovery medium and keeping it available through policy based medium changes.

Figure 1:
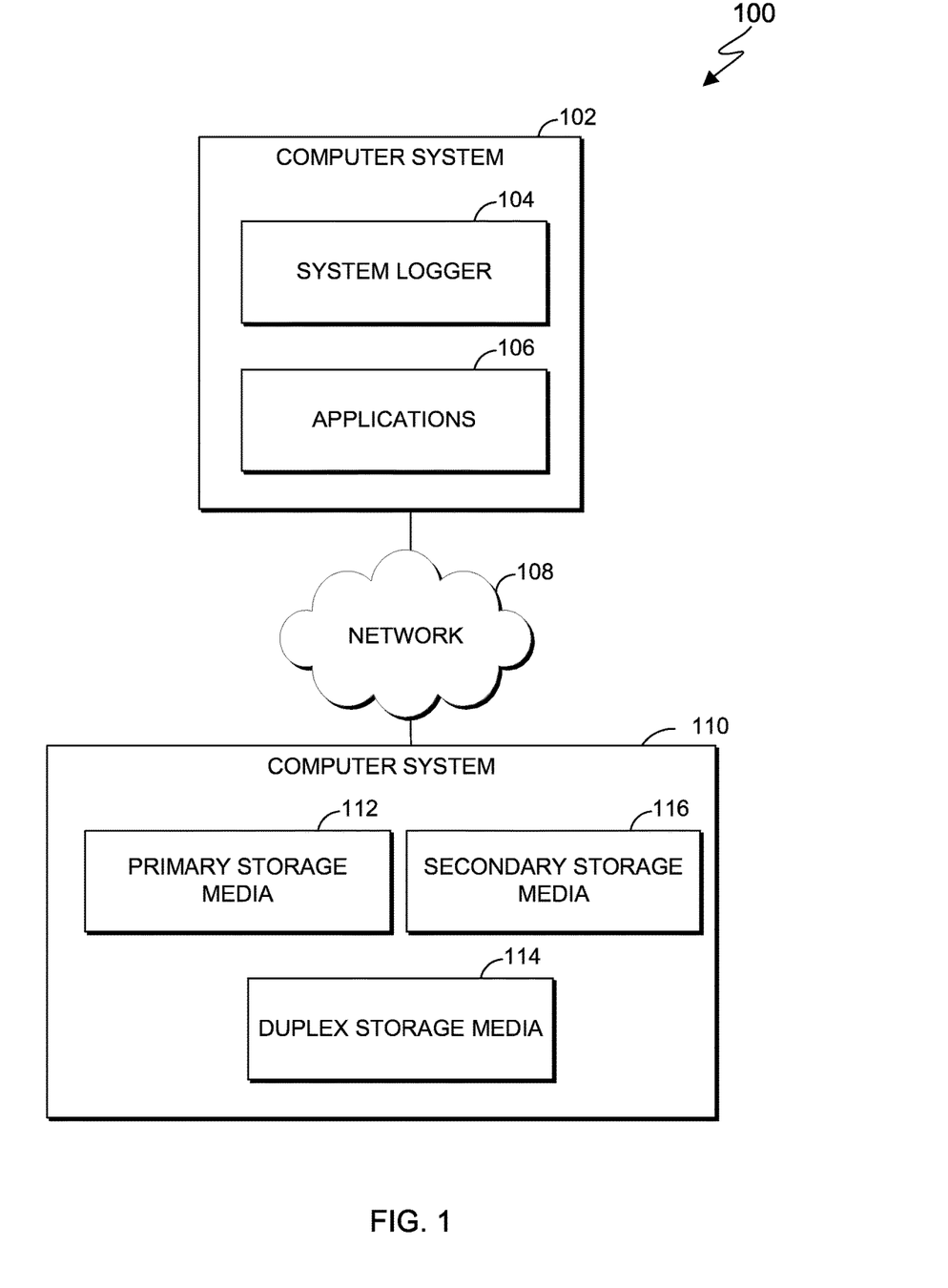
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 102 and computer system 110. Computer system 102 and computer system 110 can be desktop computers, laptop computers, specialized computer servers, or any other computer systems known in the art. In certain embodiments, computer system 102 and computer system 110 represent computer systems utilizing clustered computers and components to act as a single pool of seamless resources when accessed through network 108. In general, computer system 102 and computer system 110 are representative of any electronic devices, or combination of electronic devices, capable of executing machine-readable program instructions, as described in greater detail with regard to FIG. 4.

Computer system 102 includes system logger 104 and applications 106. System logger 104 provides logging services and manages log data written by applications 106. System logger 104 stores log data in primary storage media 112 and duplex storage media 114. In this embodiment, duplex storage media 114 includes a plurality of different types of duplex storage media, such as local buffers and staging data sets. Furthermore, system logger 104 migrates log data from primary storage media 112 to secondary storage media 116. The term, "migration of log data", as used herein, refers to offload processing that makes more room available in primary storage media 112 for additional application 106 log data. System logger 104 also facilitates recovery of log data when primary storage media 112 in computer system 110 becomes inaccessible (e.g., from a failure) by using the log data from duplex storage media 114 and recreating the log data view in the primary storage media 112.

Figure 3:
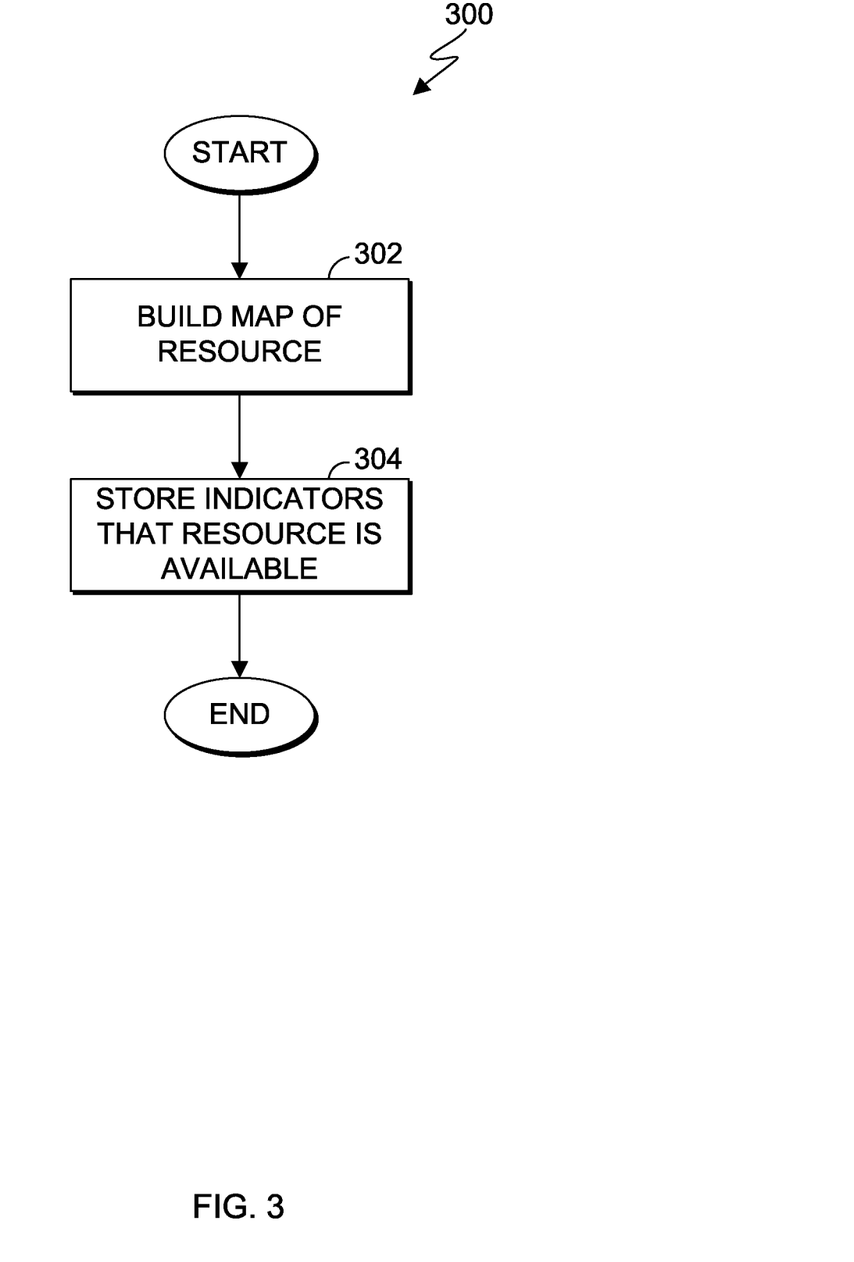
FIG. 3 is a flowchart illustrating operational steps for reinitializing a resource, in accordance with an embodiment.

Furthermore, system logger 104 can reinitialize a resource (e.g., duplex storage media 114) by building a virtual map of the resource, determining the portion of the resource that contains data that is still valid (i.e., data for which the duplex copy must be maintained because it has not yet been offloaded or deleted), and determining the point in the duplex storage media where new writes can start as discussed in greater detail with regard to FIG. 3. The term "reinitializing a resource", as used herein, refers to a process of preparing a resource to be reused as a duplex storage medium.

Network 108 can be, for example, a local area network (LAN), a wide area network (WAN) such as the Internet, or a combination of the two, and include wired, wireless, or fiber optic connections. In general, network 108 can be any combination of connections and protocols that will support communications between computer system 102 and computer system 110, in accordance with a desired embodiment of the invention.

Computer system 110 includes primary storage media 112, duplex storage media 114, and secondary storage media 116. Primary storage media 112 receives and stores inputs from system logger 104 and serves as a main memory storage for log data of applications 106. Duplex storage media serves as a recover "fail safe" for primary storage media 112 since primary storage media is normally considered non-persistent storage media. Duplex storage media 114 receives and stores a copy of the inputs transmitted to primary storage media 112 from system logger 104. Different types of duplex storage media 114 can be used based, at least in part, on policies of an installation. For example, a more persistent duplex storage media could be used when computer system 102 is in a volatile state (e.g., when computer system 102 is powered by its battery) as opposed to a less persistent duplex storage media being used when computer system 102 is in a non-volatile state (e.g., when a computer system 102 is powered by an electrical outlet). In this embodiment, the duplex media types can be a staging data set or local buffers. A "staging data set", as used herein, refers to a duplex media type that is used to mirror log data from primary storage media 112 to a file on disk and is typically used when computer system 102 is in a non-volatile state (e.g., when a computer system 102 is powered by an electrical outlet). In contrast, a "local buffer", as used herein, refers to a duplex media type that is used to minor log data from primary storage media 112 to local memory and is typically used when computer system 102 is in a volatile state (e.g., when computer system 102 is powered by its battery).

Secondary storage media 116 receives log data from primary storage media 112 during offload processing. In general, secondary storage media 116 serves as storage for log data of primary storage media 112 no longer deemed necessary to be stored in primary storage media 112. In other words, secondary storage media 116 serves as a "spillover" storage media for data primary storage media 112 no longer uses.

In general, primary storage media 112, duplex storage media 114, and secondary storage media 116 can be implemented using any desirable storage media known in the art. For example, primary storage media 112, duplex storage media 114, and secondary storage media 116 can be implemented with a tape library, optical library, one or more independent disk (RAID). Similarly, primary storage media 112, duplex storage media 114, and secondary storage media 116 can be implemented with any suitable storage architecture known in the art, such as a relational database, an object-orientated database, and/or one or more tables.

For illustrative purposes, FIG. 1 shows primary storage media 112, duplex storage media 114, and secondary storage media 116 as being stored on a different computer system (e.g., computer system 110) than system logger 104 and applications 106; however, it should be understood that primary storage media 112, duplex storage media 114, and secondary storage media 116 can reside on the same computer system (e.g., computer system 102) as system logger 104 and applications 106.

Figure 2:
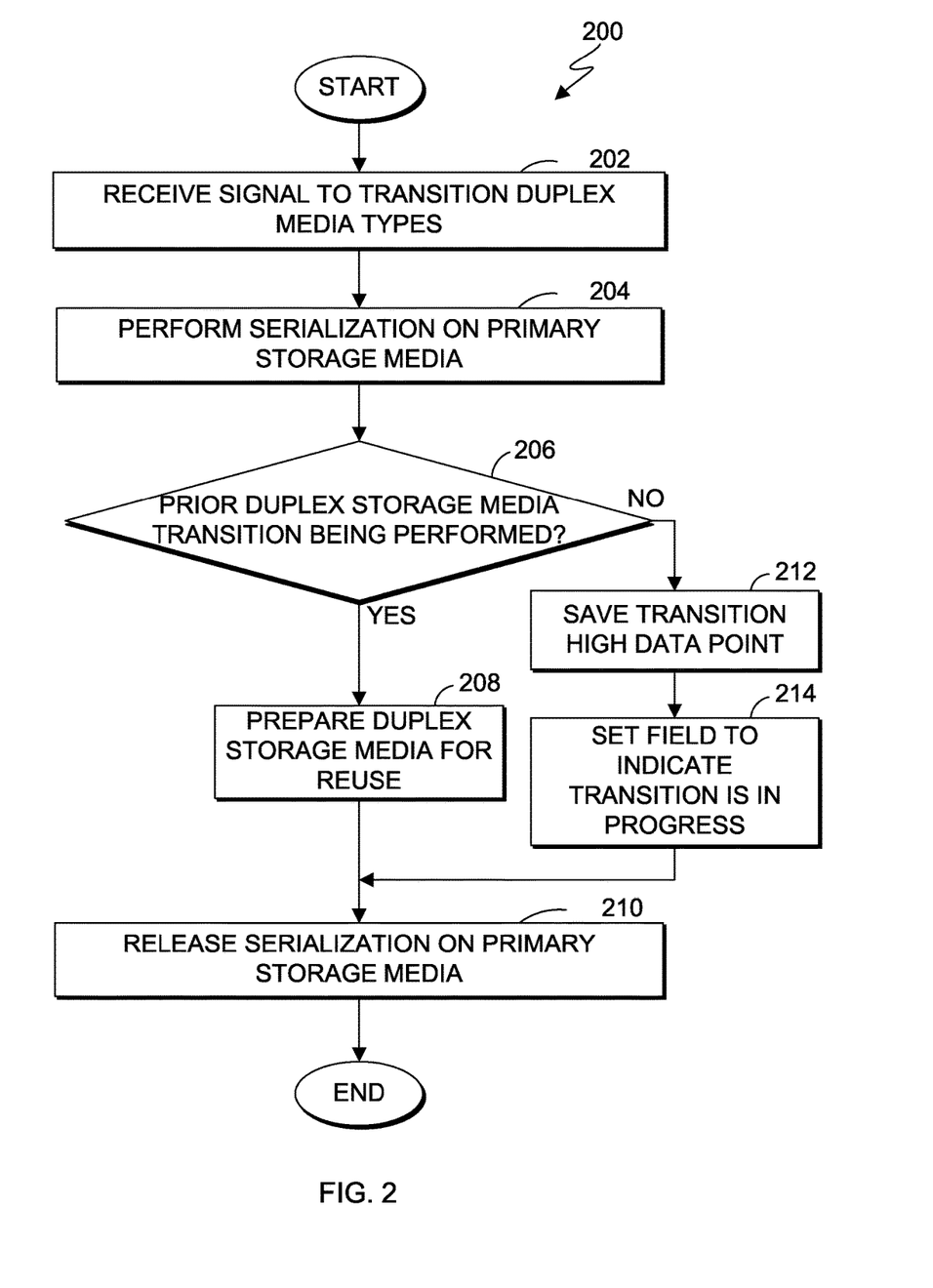
FIG. 2 is a flowchart illustrating operational steps for preparing a duplex storage media for reuse, in accordance with an embodiment of the present invention.

FIG. 2 is a flowchart 200 illustrating operational steps for preparing a duplex storage media for reuse, in accordance with an embodiment of the present invention. For illustrative purposes, the following discussion is made with respect to a transition being performed from a local buffer duplex media type of duplex storage media 114 to a staging data set duplex media type of duplex storage media 114, it being understood that a transition can also be performed from a staging data set duplex media type to a local buffer duplex media type. For example, a transition may be performed from a local buffer duplex media type to a staging data set duplex media type and, during that transition, another transition may be requested from the staging data set duplex media type to the local buffer duplex media type. Similarly, transitions can be performed between various media types other than a local buffer duplex media type and a staging data set duplex media type.

In step 202, system logger 104 receives a signal to transition between duplex storage media types of duplex storage media 114. In this embodiment, the signal can be an occurrence in computing environment 100 that indicates that computer system 102 is no longer volatile and has become non-volatile. System logger 104 can then interpret the signal to transition from a volatile duplex media type (e.g., local buffers) to a non-volatile duplex media type (e.g., staging data sets). In another embodiment, the signal can be an occurrence in computing environment 100 that indicates that computer system 102 has become volatile (i.e., no longer stable). For example, system logger 104 can receive a signal that the AC input voltage that provides the main power supply to computer system 102 is below an acceptable level.

In step 204, system logger 104 performs serialization on primary storage media 112. In this embodiment, system logger 104 performs serialization of primary storage media 112 by controlling access to primary storage media 112 such that applications 106 cannot write new data to primary storage media 112. In other words, system logger 104 denies access to primary storage media 112 to applications 106.

In step 206, system logger 104 determines whether a prior transition between duplex storage media types is being or has been performed. In this embodiment, system logger 104 determines whether a prior duplex storage media transition is being performed by identifying from an indicator (e.g., a flag) that a copy of data resides on the duplex media type being transitioned to. For example, a previous transition from staging data set duplex media type containing data (e.g., control block D) was performed to local buffer duplex media type where new writes (e.g., control blocks E-M). System logger 104 then received a signal to transition between duplex storage media types (e.g., from local buffer duplex media type to staging data set duplex media type). Responsive to receiving a signal to transition between duplex storage media types, system logger 104 can then identify from an indicator that the staging data set duplex media type contains data (e.g., control block D).

If, in step 206, system logger 104 determines that a prior transition is being performed, then, in step 208, system logger 104 prepares for reuse, the newly intended duplex storage media (e.g., duplex storage media 114). In this embodiment, system logger 104 prepares duplex storage media 114 for reuse by building a virtual map of the data that can be accessed for future transitions, as discussed in greater detail with regard to FIG. 3.

In step 210, system logger 104 releases serialization. In this embodiment, system logger 104 releases the serialization performed on primary storage media 112 so that new writes can be written on primary storage media 112. Accordingly, system logger 104 can now reuse duplex storage media 114 (i.e., a previous version) to store duplex data of newly received application data, as well as duplex data transferred from.

If, in step 206, system logger 104 determines that a prior duplex storage media transition is not being performed, then, in step 212, system logger 104 saves a transition high data point. The term, "transition high data point", as used herein, refers to a data point that is recorded and is used to indicate locations of sets of data that are valid. When system logger 104 performs a transfer of data, system logger 104 can reference the transition high data point to identify which sets of data are valid and need to be transferred. In this embodiment, system logger 104 copies over data to duplex storage media 114. For example, system logger 104 saves a copy of the memory start and end addresses which can be used to recover data stored in the event of a future transition between storage media types.

In step 214, system logger 104 sets a field to indicate that a duplex storage media transition is in progress. In this embodiment, system logger 104 sets the field to indicate that a transition is in progress, which notifies the installation of the state of the log stream resources.

FIG. 3 is a flowchart 300 illustrating operational steps for reinitializing a resource, in accordance with an embodiment. For example, the operational steps of FIG. 3 can be performed at step 208 of flowchart 200.

In step 302, system logger 104 builds a map of the resource (e.g., existing duplex storage media 114) intended for use after the transition. In this embodiment, system logger 104 builds a map of duplex storage media 114 by recording the amount of valid data (i.e., data that has not yet been offloaded and will be moved and/or deleted) in primary storage media 112 and recording a location where new writes can begin on existing duplex storage media 114. For example, system logger 104 can record the amount of valid data by initializing a log file to identify the log file size (e.g., 1000 bytes) and segments of valid data (100 bytes). The map of the resource can then be accessed in the event of a subsequent transition.

System logger 104 can then save a transition high data point, as previously described in step 212 of flowchart 200 so that when system logger 104 performs a transfer of data, system logger 104 can reference the transition high data point to identify which sets of data are valid and need to be transferred. Accordingly, system logger 104 can then set a field to indicate that a duplex storage media transition is in progress which, again, notifies the installation of the state of the log stream resources. In other embodiments, system logger 104 can save a transition high data point and a field to indicate that a duplex storage media transition is in progress before building a map of the resource.

In step 304, system logger 104 stores indicators that the resource is available. In this embodiment, system logger 104 stores indicators (e.g., locally) that alerts system logger 104 and/or applications 106 that duplex media storage resources in computer system 110 are available to be used.

Figure 4:
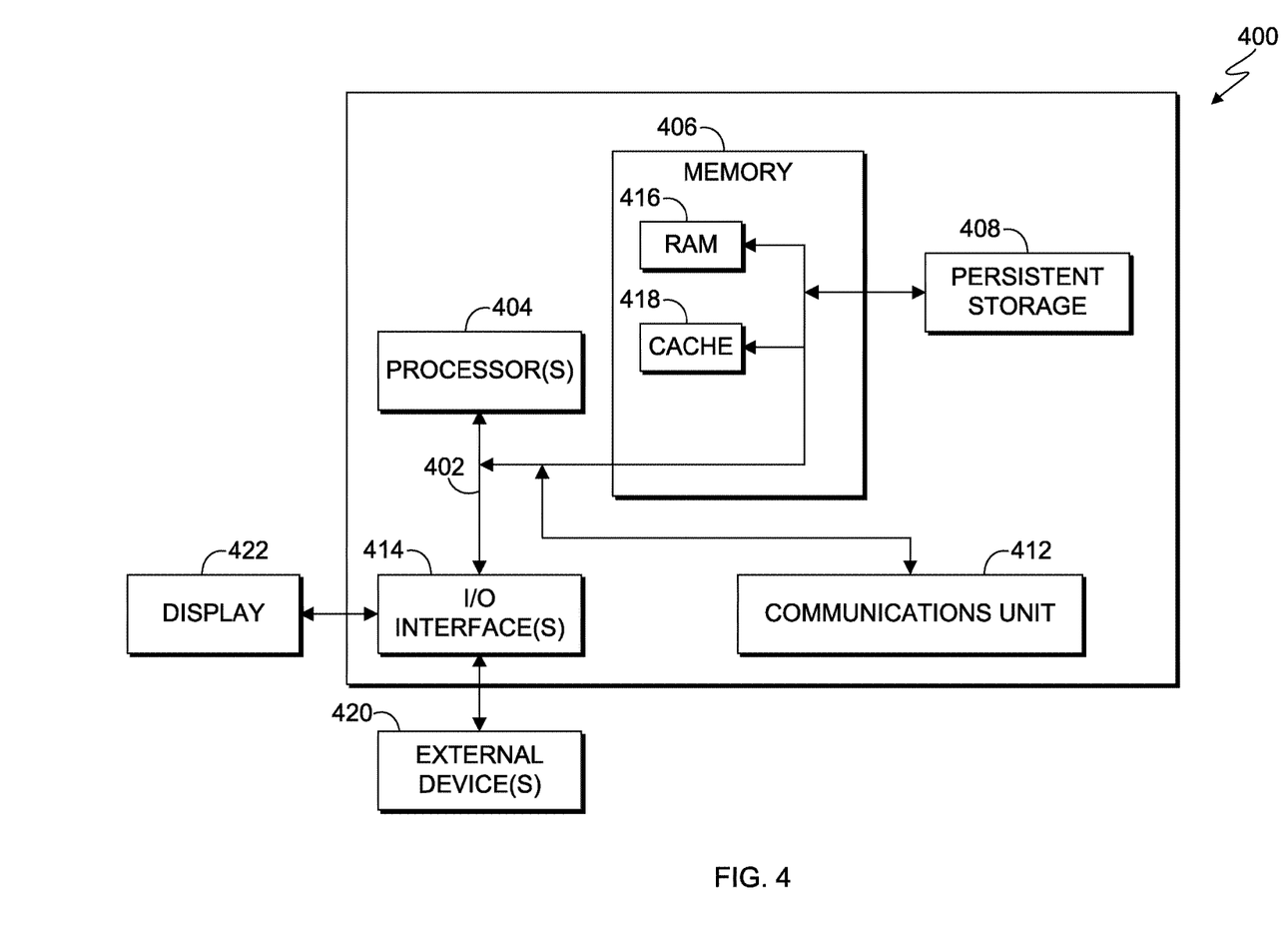
FIG. 4 is a block diagram of internal and external components of the computer systems of FIG. 1, in accordance with an embodiment of the present invention.

FIG. 4 is a block diagram of internal and external components of a computer system 400, which is representative of the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions.

Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 108). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, application data;
   storing, by the one or more computer processors, the application data on a primary storage media;
   storing, by the one or more computer processors, duplex data of the application data on a first duplex storage media or a second duplex storage media;
   receiving, by the one or more processors, a signal to transition from the first duplex storage media to the second duplex storage media based on a detected volatility change of a power source,
   wherein the first duplex storage media is a media type that exclusively receives the duplex data during a volatile power state,
   wherein the second duplex storage media is a media type that exclusively receives the duplex data during a non-volatile- power state, and
   wherein the primary storage media, the first duplex storage media, and the second duplex storage media reside on a single computer system;
   responsive to receiving, by the one or more computer processors, the signal to transition from the first duplex storage media to the second duplex storage media, determining, by the one or more computer processors, an amount of valid first duplex data that the second duplex storage media must maintain, as application data corresponding to the first duplex data has not yet been offloaded or deleted from the primary storage media;
and
   responsive to determining the amount of valid first duplex data that must be maintained, determining, by the one or more computer processors, that the second duplex storage media already contains a portion of valid first duplex data as indicated by a stored indicator from a previous transition;
   reinitializing, by the one or more computer processors, the second duplex storage media by transferring the remaining portion of the valid first duplex data that is, no already contained on the second duplex storage media from the first duplex storage media to the second duplex storage media.

2. The method of claim 1, further comprising:
   responsive to receiving, by the one or more computer processors, the signal to transition from the first duplex storage media to the second duplex storage media, performing, by the one or more computer processors, a serialization on the primary storage media to suspend storage of received application data on the primary storage media.

3. The method of claim 2, further comprising:
   responsive to reinitializing, by the one or more computer processors, the second duplex storage media, resuming storage of received application data on the primary storage media, and transferring, by the one or more computer processors, duplex data from the first duplex storage media to the second duplex storage media.

4. The method of claim 2, further comprising:
   responsive to reinitializing, by the one or more computer processors, the second duplex storage media, storing, by the one or more computer processors, duplex data of newly received application data on the second duplex storage media.

5. The method of claim 1, wherein reinitializing, by the one or more computer processors, the second duplex storage media to receive for storage duplex data from the first duplex storage media comprises:
   recording, by the one or more computer processors, an amount of valid data on the second duplex storage media; and
   recording, by the one or more computer processors, a location on the second duplex storage media where new writes can begin.

6. The method of claim 5, further comprising:
   storing, by the one or more computer processors, an indicator that indicates That the second duplex storage media is available for reuse.

7. The method of claim 1, further comprising:
   responsive to receiving, by the one or more computer processors, a signal to transition from the second duplex storage media to the first duplex storage media, determining, by the one or more computer processors, whether a prior transition from the second duplex storage media to the first duplex storage media is being performed; and
   responsive to determining that a prior transition from the second duplex storage media to the first duplex storage media is being performed, reinitializing, by the one or more computer processors, the first duplex storage media to receive for storage duplex data transferred from the second duplex storage media.

8. A computer program product comprising;
   one or more computer readable storage media and program instructions stored on the one or more computer readable storage media, the program instructions comprising:
   program instructions to receive application data
   program instructions to store the application data on a primary storage media;
   program instructions to store duplex data of the application data on a first duplex storage media or a second duplex storage media;
   program instructions to receive a signal to transition from the first duplex storage media to the second duplex storage media based on a detected volatility change of a power source,
   wherein the first duplex storage media is a media type that exclusively receives the duplex data during a volatile power state,
   wherein the second duplex storage media is a media type that exclusively receives the duplex data during a non-volatile power state, and
   wherein the primary storage media, the first duplex storage media, and the second duplex storage media reside on a single computer system;
   program instructions to, responsive to receiving the signal to transition from the first duplex storage media to the second duplex storage media, program instructions to determine an amount of valid first duplex data that the second duplex storage media must maintain, as application data corresponding to the first duplex data has not yet been offloaded or deleted from the primary storage media, and program instructions to determine, responsive to determining the amount of valid first duplex data that must be maintained, that the second duplex storage media already contains a portion of valid first duplex data as indicated by a stored indicator from a previous transition;

program instructions to reinitialize the second duplex storage media by transferring the remaining portion of the valid first duplex data that is not already contained on the second duplex storage media from the first duplex storage media to the second duplex storage media.

9. The computer program product of claim 8, wherein the program instructions stored on the one or more computer readable storage media further comprise:

program instructions to, responsive to receiving the signal to transition from the first duplex storage media to the second duplex storage media, perform a serialization on the primary storage media to suspend storage of received application data on the primary storage media.

10. The computer program product of claim 9, wherein the program instructions stored on the one or more computer readable storage media further comprise:

program instructions to, responsive to reinitializing the second duplex storage media, resume storage of received application data on the primary storage media, and transfer duplex data from the first duplex storage media to the second duplex storage media.

11. The computer program product of claim 9, wherein the program instructions stored on the one or more computer readable storage media further comprise:

program instructions to, responsive to reinitializing the second duplex storage media, store duplex data of newly received application data on the second duplex storage media.

12. The computer program product of claim 8, wherein the program instructions to reinitializing, by the one or more computer processors, the second duplex storage media to receive for storage duplex data from the first duplex storage media comprise:

program instructions to record an amount of valid data on the second duplex storage media; and program instructions to record a location on the second duplex storage media where new writes can begin.

13. The computer program product of claim 12, wherein the program instructions stored on the one or more computer readable storage media further comprise:

program instructions to store an indicator that indicates that the second duplex storage media is available for reuse.

14. The computer program product of claim 8, wherein the program instructions stored on the one or more computer readable storage media further comprise:

program instructions to, responsive to receiving a signal to transition from the second duplex storage media to the first duplex storage media, determine whether a prior transition from the second duplex storage media to the first duplex storage media is being performed; and program instructions to, responsive to determining that a prior transition from the second duplex storage media to the first duplex storage media is being performed, reinitialize the first duplex storage media to receive for storage duplex data transferred from the second duplex storage media.

15. A computer system comprising:

one or more computer processors;

one or more computer readable storage media; and program instructions stored on the one or more computer readable storage media for execution by at least one of the one or more computer processors, the program instructions comprising:

program instructions to receive application data;

program instructions to store the application data on a primary storage media;

program instructions to store duplex data of the application data on a first duplex storage media or a second duplex storage media, program instructions to receive a signal to transition from the first duplex storage media to the second duplex storage media based on a detected volatility change of a power source, wherein the first duplex storage media is a media type that exclusively receives the duplex data during a volatile power state, wherein the second duplex storage media is a media type that exclusively receives the duplex data during a non-volatile power state, and wherein the primary storage media, the first duplex storage media, and the second duplex storage media reside on a single computer system;

program instructions to determine, responsive to receiving the signal to transition from the first duplex storage media to the second duplex storage media, an amount of valid first duplex data that the second duplex storage media must maintain, as application data corresponding to the first duplex data has not yet been offloaded or deleted from the primary storage media; and program instructions to determine, responsive to determining the amount of valid first duplex data that must be maintained, that the second duplex storage media already contains a portion of valid first duplex data as indicated by a stored indicator from a previous transition;

program instructions to reinitialize the second duplex storage media by transferring the remaining portion of the valid first duplex data that is not already contained on the second duplex storage media from the first duplex storage media to the second duplex storage media.

16. The computer system of claim 15, wherein the program instructions stored on the one or more computer readable storage media further comprise:

program instructions to, responsive to receiving the signal to transition from the first duplex storage media to the second duplex storage media, perform a serialization on the primary storage media to suspend storage of received application data on the primary storage media.

17. The computer system of claim 16, wherein the program instructions stored on the one or more computer readable storage media further comprise:

program instructions to, responsive to reinitializing the second duplex storage media, resume storage of received application data on the primary storage media, and transfer duplex data from the first duplex storage media to the second duplex storage media.

18. The computer system of claim 16, wherein the program instructions stored on the one or more computer readable storage media further comprise:

program instructions to, responsive to reinitializing the second duplex storage media, store duplex data of newly received application data on the second duplex storage media.

19. The computer system of claim 15, wherein the program instructions to reinitialize, by the one or more computer processors, the second duplex storage media to receive for storage duplex data from the first duplex storage media comprise:

program instructions to record an amount of valid data on the second duplex storage media; and program instructions to record a location on the second duplex storage media where new writes can begin.

20. The computer system of claim 19, wherein the program instructions stored on the one or more computer readable storage media further comprise:

program instruct to store an indicator that indicates that the second duplex storage media is available for reuse.

\* \* \* \* \*